Patented Nov. 6, 1951

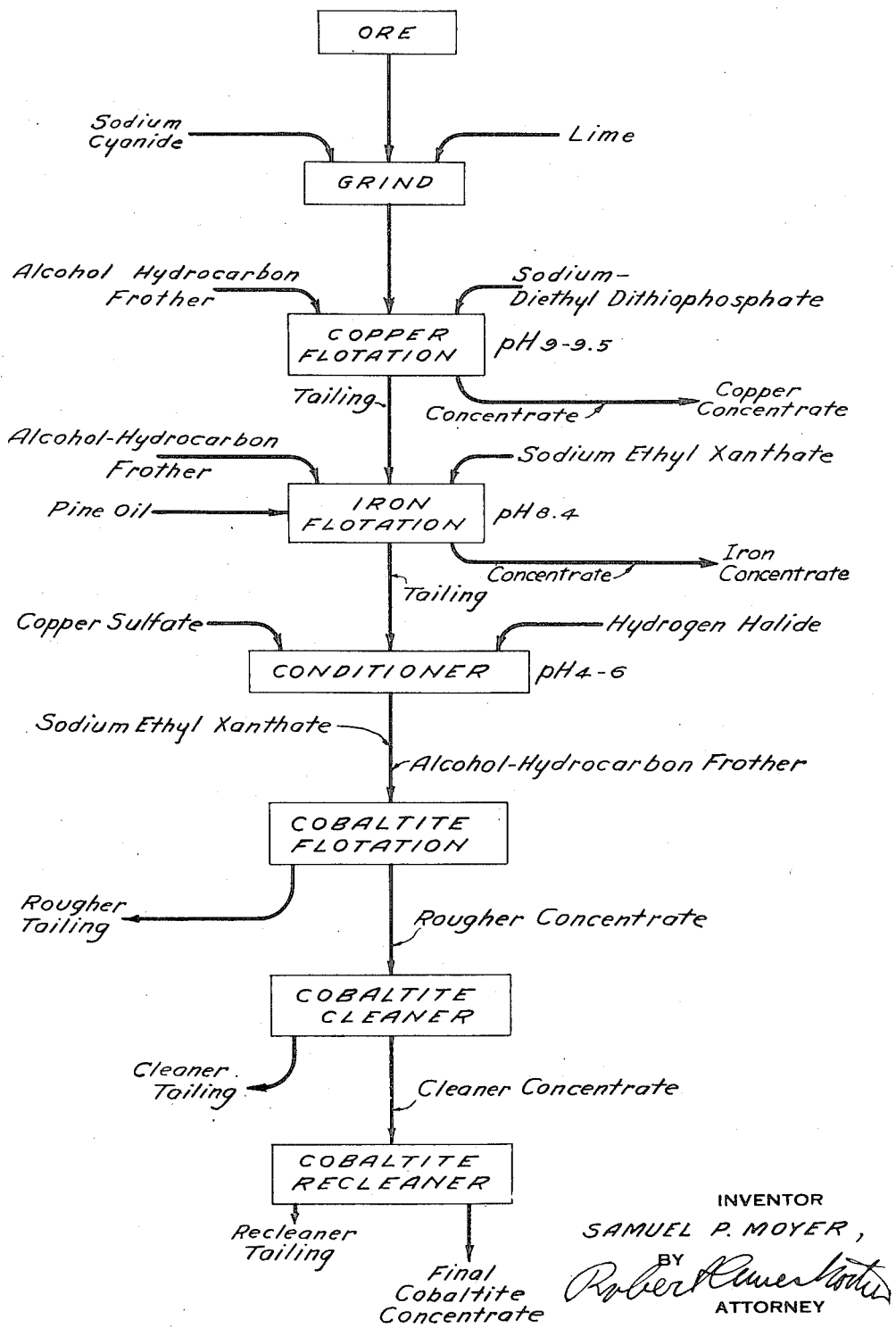

2,573,865

UNITED STATES PATENT OFFICE 2,573,865

FLOTATION OF COBALTITE

Samuel Payne Moyer, Butte, Mont., assignor to American Cyanamid Company, New York, N. Y., a corporation of Maine Application February 14, 1948, Serial No. 8,309

8 Claims. (Cl. 209—167)

1

This invention relates to an improved method of floating cobaltite, and more particularly to a process of selectively separating cobaltite from copper sulfides.

Cobaltite often occurs in admixture with sulfides of iron and copper. Usually, it is present in much smaller proportions than the associated minerals and its separation by flotation processes presents a serious problem because if it is attempted to float all of the iron away from the cobaltite, separation is not sufficiently sharp and much cobaltite is lost. The grade is also adversely affected which presents a very serious problem since in many ores containing cobaltite in association with sulfides of iron and/or copper, the cobaltite is present in comparatively low concentration.

Among typical ores containing cobaltite are those which contain both copper and iron sulfides. For example, an ore may contain chalcopyrite, pyrrhotite and pyrite associated with the cobaltite. It has been customary to treat such an ore in a three-step process by first floating a copper concentrate in alkaline circuit, then neutralizing, making a bulk float of the iron and cobaltite, followed by floating in acid circuit with ferric sulfate and a depressant for cobaltite to produce a concentrate of pyrrhotite and pyrite. From the standpoint of recovery of the cobaltite, this process is not economically satisfactory and such an ore would not be useful as a primary source of cobaltite. One of the reasons why the above described process is not economically desirable for high cobaltite recovery lies in the fact that in the last step the cobaltite remains in the underflow product and it is not readily feasible to retreat the underflow products in the manner that froth products are cleaned and re-cleaned. The grade of the cobaltite obtained is, therefore, very poor and in many cases the recovery also leaves much to be desired.

Attempts to float cobaltite as a concentrate from ores or tailings which contain iron sulfides such as pyrrhotite present serious difficulties and have not hitherto proven economically practical. Pyrrhotite is often a fast floating ore constituent and it has not been possible hitherto to achieve a speed of flotation of cobaltite sufficient to produce a satisfactory concentrate.

The present invention includes a flotation step

2 in which a cobaltite concentrate is floated from an ore containing sulfides of iron or copper by using a very special procedure in the step in which the cobaltite concentrate is produced. The process is either a two-step or three-step process depending on whether there is sufficient copper sulfide present to warrant removal as a copper concentrate. Where there are only sulfides of iron or in the case of a copper-containing ore where the tailing from a rougher copper float in alkaline circuit leaves mainly iron sulfides and cobaltite, the process of the present invention requires first a selective float of a large portion of the sulfides of iron. This flotation step requires in addition to a frother and a conventional sulfide flotation collector, such as a xanthate, the presence of a particular depressant for cobaltite; namely a soluble cyanide. The flotation is effected under alkaline conditions and then the underflow products, which contains the major portion of the cobaltite and some iron sulfides is conditioned with copper sulfate and a hydrogen halide in amount sufficient to bring the subsequent flotation circuit definitely on the acid side, varying from 4 to 7.

At first glance, the last step of the process of the present invention appears to resemble that described above in the discussion of the prior art proposal. However, the combination of the particular activator, copper sulfate instead of ferric sulfate, combined with a particular kind of acid, hydrogen halide instead of the more common sulfuric acid, and when a particular kind of cobaltite depressant, namely a soluble cyanide was used in the preceding step, reverses the flotation. Instead of obtaining a froth products which the prior proposals state contains primarily pyrrhotite and other iron sulfides, a high grade cobaltite froth product is obtained associated with little or no iron sulfides.

It is not known why this extraordinary result is obtained when a particular acid is used associated with a particular activator and depressant. It is not desired to limit the present invention to a theory of action. The hydrogen halide, however, must exert a definite chemical action in the flotation process because when it is replaced with sulfuric acid, no useful recovery of a satisfactory cobaltite concentrate is obtained. Copper sulfate alone will not produce the results of the present invention nor will the hydrogen halide alone. Only when the two are combined is it possible to obtain an excellent recovery of cobaltite and a good grade of concentrate. The chemical nature of the two constituents appears to be quite critical.

While hydrogen halides are generally useful, their efficiency varies. The best results are obtained with hydrofluoric acid and this is the preferred hydrogen halide. However, hydrochloric acid gives results which are almost as good and are quite useful practically. In some cases, it may even be preferred on economic grounds although the improvement in recovery and quality of the concentrate is normally sufficient to overcome the slight additional price where hydrofluoric acid replaces hydrochloric acid.

The extreme rapidity with which cobaltite floats under the restricted conditions of the present invention is of great practical importance because one of the reasons why the recovery of cobaltite from ores containing pyrrhotite was unsatisfactory lay in the fact that pyrrhotite often floats so fast that it was always necessary to produce iron concentrates, leaving the cobaltite in the underflow. This speed of float, which also reduces the cost of equipment markedly, is obtained only when copper sulfate is used with the hydrogen halides in strongly acid circuit in accordance with the process of the present invention.

In the flotation circuit, the halogen is present as the acid and it has to be present as the acid since flotation in the presence of halides but at pH's too high to produce the hydrogen halide does not give the excellent results of the present invention. However, it is immaterial whether the hydrogen halide is added as the acid or as a salt such as a sodium or potassium salt together with sufficient sulfuric acid to set free the hydrogen halide in the actual flotation circuit. The presence of sulfate ions does not adversely affect the flotation process, but the halogen ions in the form of halogen halide must be present in order to obtain the improved recovery and grade.

In the specification and claims, the term "hydrogen halide" is used in accordance with the ordinary chemical notation in which the halogen acids are written in a formula as if they were hydrogen halides. The term is used in this particular sense in the present specification and is not limited to anhydrous gaseous halogen halides which, of course, cannot exist as such in the dilute aqueous pulp in the flotation circuit.

The invention will be described in greater detail in conjunction with the following specific examples: In these examples a test ore was used from Idaho containing cobaltite, chalcopyrite, pyrrhotite and pyrite associated with siliceous gangue minerals. The ore had a copper content of about 2.7%, about 0.75% of cobaltite, and about 27% of iron, the exact figures varying slightly with different head samples as will appear from the tables in the examples themselves.

The invention will also be described in conjunction with the drawing which constitutes a flowsheet illustrating the process of the examples.

Example 1

The ore was ground with 8.5 lbs. per ton of lime and 0.05 lb. per ton of sodium cyanide. It was then floated at a pH of 9 with 0.05 lb. per ton of the sodium salt of diethyl dithiophosphoric acid and 0.09 lb. per ton of a frother consisting of about 60% of saturated paraffin alcohols having from 7 to 10 carbon atoms and 40% of a light hydrocarbon oil. A rougher float resulted, producing a copper concentrate which was not further cleaned.

The underflow was then floated with an additional 0.15 lb. per ton of sodium ethyl xanthate, 0.06 lb. per ton of the alcohol frother described above and 0.04 lb. per ton of pine oil. The pH was maintained at about 8.4. An iron froth product was obtained which was not further cleaned.

The underflow was then activated with 2 lbs. per ton of copper sulfate and 2 lbs. per ton of hydrofluoric acid. The pH was brought to 4.6 and a cobalt concentrate was obtained floating with an additional 0.15 lb. per ton of the sodium ethyl xanthate and an additional 0.09 lb. per ton of the alcohol frother described above. The concentrate obtained was cleaned and recleaned, both cleaner tails being combined for assay. The metallurgical results appear in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 10.1 | 24.95 | 0.18 | 92.1 | 2.5 |
| Iron Ct | 32.1 | 0.45 | 0.62 | 5.3 | 27.7 |
| Recl. Co Ct | 3.3 | 0.44 | 13.65 | 0.5 | 62.2 |
| Cl. Co Tails | 3.4 | 0.77 | 0.73 | 0.9 | 3.5 |
| Rgh. Tailing | 51.1 | 0.06 | 0.06 | 1.2 | 4.1 |
| Calc. Head | 100.0 | 2.74 | 0.72 | 100.0 | 100.0 |

Example 2

The procedure of Example 1 was followed but the hydrofluoric acid was omitted from the conditioning step of the iron flotation tailing. The pH for the cobalt flotation was 7.1. The metallurgical results appear in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 8.2 | 28.68 | 0.41 | 87.3 | 4.6 |
| Iron Ct | 29.7 | 0.89 | 0.54 | 9.8 | 21.7 |
| Recl. Co Ct | 1.2 | 0.38 | 11.70 | 0.2 | 19.0 |
| Cl. Co Tails | 2.8 | 0.79 | 4.00 | 0.8 | 15.2 |
| Rgh. Tailing | 58.1 | 0.09 | 0.50 | 1.9 | 39.5 |
| Calc. Head | 100.0 | 2.69 | 0.74 | 100.0 | 100.0 |

It will be apparent that copper sulfate alone does not give a satisfactory recovery of cobalt.

Example 3

The procedure of Example 1 was followed but 4 lbs. per ton of sulfuric acid was substituted for the 2 lbs. per ton of hydrofluoric acid. The pH of flotation was 4.6. The metallurgical results are shown in the following table.

| Product | Per Cent Wt. | Per Cent Cu | Per Cent Co | Per Cent Distr. | |
|---|---|---|---|---|---|
| | | | | Cu | Co |
| Rgh. Cu Ct | 8.2 | 28.68 | 0.22 | 85.9 | 2.7 |
| Iron Ct | 29.3 | 1.05 | 0.48 | 11.4 | 20.8 |
| Recl. Co Ct | 1.7 | 0.37 | 15.87 | 0.2 | 39.8 |
| Cl. Co Tails | 1.8 | 0.94 | 2.74 | 0.6 | 7.2 |
| Rgh. Tailing | 59.0 | 0.09 | 0.34 | 1.9 | 29.5 |
| Calc. Head | 100.0 | 2.74 | 0.68 | 100.0 | 100.0 |

It will be noted that it is not a question of having an acid circuit alone because the sulfuric acid, even though it produced the same pH in the flotation circuit, did not give satisfactory recoveries of cobalt, the recovery dropping from the 60% to below 40%. It is evident from this example that the chemical nature of the halogen acid plays a part in the flotation and it is not merely a question of achieving a particular pH in the flotation circuit with any acid capable of giving that pH.

Example 4

The procedure of Example 3 was followed but 2 lbs. per ton of sodium fluoride was added. This reacted with the sulfuric acid to give hydrofluoric acid but reduced the acidities so that the pH in the cobalt flotation was 5.1. The metallurgical results appear in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 8.1 | 28.99 | 0.36 | 87.0 | 4.0 |
| Iron Ct | 29.2 | 0.92 | 0.54 | 10.0 | 21.7 |
| Recl. Co Ct | 6.6 | 0.30 | 7.13 | 0.7 | 64.6 |
| Cl. Co Tails | 2.0 | 0.97 | 1.40 | 0.7 | 3.8 |
| Rgh. Tailing | 54.1 | 0.08 | 0.08 | 1.6 | 5.9 |
| Calc. Head | 100.0 | 2.70 | 0.73 | 100.0 | 100.0 |

It will be noted that as soon as the halogen acid, hydrofluoric acid, is present, recoveries of cobalt immediately return to the high values in the 60% range and over. While the exact pH is not critical so long as a strongly acid circuit is present the halogen acid definitely is essential.

Example 5

The procedure of Example 4 was followed but sodium chloride was substituted for sodium fluoride. The pH of the cobalt flotation was 4.9. The metallurgical results are shown in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 8.6 | 27.98 | 0.44 | 85.9 | 5.4 |
| Iron Ct | 29.1 | 0.78 | 0.52 | 8.4 | 21.6 |
| Recl. Co Ct | 5.8 | 0.28 | 7.52 | 0.6 | 62.1 |
| Cl. Co Tails | 2.0 | 0.71 | 1.14 | 0.5 | 3.3 |
| Rgh. Tailing | 54.5 | 0.08 | 0.10 | 1.6 | 7.6 |
| Calc. Head | 100.0 | 2.71 | 0.70 | 100.0 | 100.0 |

It will be noted that the substitution of sodium chloride for sodium fluoride which results in the presence in the flotation circuit of hydrochloric acid rather than hydrofluoric acid does not seriously affect the recovery, it is reduced a little but no significantly.

Example 6

The ore was ground with 6.5 lbs. per ton of lime and 0.05 lb. per ton of sodium cyanide. A rougher copper float was effected at a pH of 9.2 using 0.05 lb. per ton of the sodium salt of diethyl diethiophosphoric acid and 0.09 lb. per ton of the alcohol frother used in the preceding example. An iron concentrate was floated using an additional 0.15 lb. per ton of sodium ethyl xanthate, 0.06 lb. per ton of the alcohol frother, and 0.04 lb. per ton of pine oil. The tailing from the iron concentrates was then conditioned with 2 lbs. per ton of copper sulfate and 5 lbs. per ton of hydrochloric acid, a pH of 4.6 resulting. A cobalt concentrate was then floated with 0.15 lb. per ton of the sodium salt of diethyl dithiophosphoric acid and 0.09 lb. per ton of the alcohol frother. The concentrate was cleaned and then recleaned using an additional 0.03 lb. per ton of the alcohol frother in each flotation. The metallurgical results appear in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 8.5 | 27.95 | 0.29 | 86.7 | 3.5 |
| Ct. #2 | 30.4 | 1.00 | 0.52 | 11.1 | 22.3 |
| Recl. Co Ct | 4.2 | 0.29 | 10.83 | 0.4 | 64.2 |
| Cl. Co Tails | 1.8 | 0.82 | 1.19 | 0.5 | 3.0 |
| Rgh. Tail | 55.1 | 0.06 | 0.09 | 1.3 | 7.0 |
| Calc. Head | 100.0 | 2.74 | 0.71 | 100.0 | 100.0 |

It will be noted that hydrochloric acid appears to give almost as good results as hydrofluoric acid as far as grade is concerned and as good or slightly better recovery.

Example 7

The procedure of Example 6 was followed but 2 lbs. per ton of sodium fluoride were used in place of the hydrochloric acid. The resulting pH was 7.5. Metallurgical results are shown in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 10.6 | 23.22 | 0.33 | 90.1 | 4.8 |
| Ct. #2 | 31.7 | 0.59 | 0.77 | 6.8 | 33.4 |
| Recl. Co Ct | 2.3 | 0.42 | 15.14 | 0.4 | 47.6 |
| Cl. Co Tails | 2.3 | 1.11 | 1.99 | 1.0 | 6.3 |
| Rgh. Tail | 53.1 | 0.09 | 0.11 | 1.7 | 7.9 |
| Calc. Head | 100.0 | 2.73 | 0.73 | 100.0 | 100.0 |

It will be noted that when the pH is brought up as high as 7.5 there is a marked loss in recovery of cobalt although the recovery is still materially higher than that obtainable with copper sulfate and sulfuric acid to the correct pH or with copper sulfate alone. This shows that the pH of the flotation circuit in the cobalt float is of very considerable importance although its effect is not as great as that of the combination of copper sulfate with the halogen acid. An acid circuit is definitely indicated for best results.

Example 8

The procedure of Example 6 was followed except that 4 lbs. per ton of sulfuric acid was used in place of the hydrochloric acid and 2 lbs. per ton of potassium bromide was added. This resulted in a circuit in which hydrobromic acid took the place of hydrochloric acid. The pH was 4.6. The metallurgical results are shown in the following table.

| Product | Per Cent Wt. | Assay | | Per Cent Distr. | |
|---|---|---|---|---|---|
| | | Per Cent Cu | Per Cent Co | Cu | Co |
| Rgh. Cu Ct | 8.7 | 27.36 | 0.39 | 89.9 | 4.8 |
| Ct. #2 | 31.2 | 0.64 | 0.62 | 7.6 | 27.1 |
| Recl. Co Ct | 5.0 | 0.44 | 8.56 | 0.8 | 60.1 |
| Cl. Co Tails | 1.8 | 0.74 | 1.11 | 0.5 | 2.8 |
| Rgh. Tail | 53.3 | 0.06 | 0.07 | 1.2 | 5.2 |
| Calc. Head | 100.0 | 2.65 | 0.71 | 100.0 | 100.0 |

It will be noted that when hydrobromic acid is present the recovery of cobalt is slightly less than with hydrofluoric and hydrochloric acid, but still very much higher than in Example 2 where copper sulfate above was used.

I claim:

1. A method of separating cobaltite from a mineral mixture containing sulfides of iron, which comprises subjecting said mixture to froth flotation in the presence of a sulfide promoter of the xanthate type and a soluble cyanide depressant to produce an underflow product richer in cobaltite and poorer in sulfides of other metals than said mixture, conditioning said underflow product with copper sulfate and a hydrogen halide, and effecting froth flotation in acid circuit in the presence of a sulfide promoter of the xanthate type to produce a froth product richer in cobaltite and poorer in sulfides of other metals than said underflow product.

2. A method according to claim 1 in which the pH of the cobalt float is of the order of 4.5 to 5.

3. A method according to claim 1 in which the hydrogen halide is hydrofluoric acid.

4. A method according to claim 3 in which the pH of the cobalt float is of the order of 4.5 to 5.

5. A method according to claim 1 in which the hydrogen halide is hydrochloric acid.

6. A method according to claim 5 in which the pH of the cobalt float is of the order of 4.5 to 5.

7. A method according to claim 1 in which the mineral mixture contains sulfides of copper and is subjected to an initial froth flotation in the presence of a dithiophosphate promoter for sulfides of copper and a soluble cyanide as a depressant for cobaltite, the froth flotation being in non-acid circuit and producing an underflow product poorer in sulfides of copper and richer in sulfides of other metals than the froth product, said froth product being richer in sulfides of copper.

8. A method according to claim 7 in which sodium diethyldithiophosphate is used in the production of the froth product rich in sulfides of copper and sodium ethyl xanthate is used in the other two flotations.

SAMUEL PAYNE MOYER.

REFERENCES CITED

The following references are of record in the file of this patent:

UNITED STATES PATENTS

| Number | Name | Date |
|---|---|---|
| 2,399,845 | Allen | May 7, 1946 |
| 2,403,640 | Cunningham | July 9, 1946 |